US 9,342,326 B2

(12) United States Patent
Ramarathinam et al.

(10) Patent No.: US 9,342,326 B2
(45) Date of Patent: May 17, 2016

(54) ALLOCATING IDENTIFIED INTERMEDIARY TASKS FOR REQUESTING VIRTUAL MACHINES WITHIN A TRUST SPHERE ON A PROCESSING GOAL

(75) Inventors: Aravind Ramarathinam, Issaquah, WA (US); Srivatsan Parthasarathy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 13/527,420

(22) Filed: Jun. 19, 2012

(65) Prior Publication Data
US 2013/0339950 A1    Dec. 19, 2013

(51) Int. Cl.
G06F 9/445    (2006.01)
G06F 9/455    (2006.01)
G06F 9/50     (2006.01)

(52) U.S. Cl.
CPC ........ G06F 9/44505 (2013.01); G06F 9/45533 (2013.01); G06F 9/5077 (2013.01)

(58) Field of Classification Search
None
See application file for complete search history.

(56) References Cited

U.S. PATENT DOCUMENTS

| | | | |
|---|---|---|---|
| 6,041,137 A | 3/2000 | Van Kleeck | |
| 6,223,202 B1 * | 4/2001 | Bayeh | 718/102 |
| 8,015,563 B2 | 9/2011 | Araujo et al. | |
| 8,195,774 B2 * | 6/2012 | Lambeth et al. | 709/220 |
| 8,533,729 B2 * | 9/2013 | Yao | 718/105 |
| 8,612,971 B1 * | 12/2013 | Fitzgerald et al. | 718/1 |

(Continued)

FOREIGN PATENT DOCUMENTS

WO    WO 2011081935 A2    7/2011

OTHER PUBLICATIONS

Tripathi, et al., "Crossbow: From Hardware Virtualized NICs to Virtualized Networks", in Proceedings of the 1st ACM Workshop on Virtualized Infrastructure Systems and Architectures, Aug. 17, 2011, pp. 53-61.

(Continued)

*Primary Examiner* — Abdullah Al Kawsar
*Assistant Examiner* — Jorge A Chu Joy-Davila
(74) *Attorney, Agent, or Firm* — Henry Gabryjelski; Doug Barker; Micky Minhas (57) ABSTRACT

A system in which a virtual machine manager determines tasks that are to be performed on virtual machines executing on a host computing system. The host computing system further executes an intermediary virtual machine task management module that receives virtual machine tasks from the virtual machine manager. Upon request from the virtual machines, the intermediary module identifies the tasks that are to be performed on the requesting virtual machine to the requesting virtual machine. The virtual machines may perhaps also initiate the performance of such identified tasks. Since the virtual machine itself is initiating contact with the intermediary module, and is not interacting directly with the virtual machine manager, the virtual machine manager need not be in the same sphere of trust as the virtual machine.

22 Claims, 4 Drawing Sheets

(56) References Cited

U.S. PATENT DOCUMENTS

| | | | |
|---|---|---|---|
| 2004/0221285 A1* | 11/2004 | Donovan et al. | 718/1 |
| 2008/0320583 A1 | 12/2008 | Sharma et al. | |
| 2009/0260007 A1 | 10/2009 | Beaty et al. | |
| 2009/0282404 A1* | 11/2009 | Khandekar et al. | 718/1 |
| 2010/0070725 A1 | 3/2010 | Prahlad et al. | |
| 2010/0269109 A1* | 10/2010 | Cartales | 718/1 |
| 2011/0022694 A1* | 1/2011 | Dalal et al. | 709/222 |
| 2011/0069710 A1 | 3/2011 | Naven et al. | |
| 2011/0131330 A1 | 6/2011 | Beaty et al. | |
| 2011/0197190 A1 | 8/2011 | Hattori et al. | |
| 2012/0096271 A1* | 4/2012 | Ramarathinam et al. | 713/172 |

OTHER PUBLICATIONS

"Office Action Issued in European Patent Application No. 13732679.9", Mailed Date: Jan. 18, 2016, 5 pages.

* cited by examiner

ALLOCATING IDENTIFIED INTERMEDIARY TASKS FOR REQUESTING VIRTUAL MACHINES WITHIN A TRUST SPHERE ON A PROCESSING GOAL

BACKGROUND

The virtualization of computing systems has enabled for flexible and convenient setup and maintenance of computing systems. A computing system is virtualized by having a virtual machine operate remotely from the client computing system that the virtual machine serves. The virtual machine emulates the logic of a fully operational computing system including the operating system, its various applications, and corresponding settings, and interfaces with the user via a remotely located client computing system. For instance, the virtual machine receives client input from the remote client, and provides resulting desktop image information back to the client. The client does not operate the corresponding operating system, but rather just receives the user input, and renders the desktop using the resulting desktop image provided by the virtual machine.

The virtual machine operates on a host computing system (also referred to in the art as a "host" or "node" in the technical art of virtualization) typically with many other virtual machines. The hardware used by the virtual machine is also often on the host, including processing resources, storage, network, memory, and so forth. Each virtual machine maintains the proper emulation of an isolated computing system by interfacing with the available hardware through a hypervisor.

BRIEF SUMMARY

At least one embodiment described herein relates to a system in which a virtual machine manager determines tasks that are to be performed on virtual machines executing on a host computing system. The host computing system further executes an intermediary virtual machine task management module that receives virtual machine tasks from the virtual machine manager. Upon request from the virtual machines, the intermediary module identifies the tasks that are to be performed on the requesting virtual machine to the requesting virtual machine. The virtual machines may perhaps also initiate the performance of such identified tasks. Since the virtual machine itself is initiating contact with the intermediary module, and is not interacting directly with the virtual machine manager, the virtual machine manager need not be in the same sphere of trust as the virtual machine.

As an example only, such virtual machines may, when initially spun up from a master image, be configured to ask what additional customizations are to be performed as part of the provisioning of the virtual machine. However, tasks may be for any other purpose such as the installation of updates or patches, the enabling or disabling of features (such as operating system features or configuration settings), the updating of policy, the determination of virtual machine compliance, the performance of licensing tasks, and so forth.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a system in which a virtual machine manager determines tasks that are to be performed on virtual machines executing on a host computing system. The host computing system further executes an intermediary virtual machine task management module that receives virtual machine tasks from the virtual machine manager. Upon request from the virtual machines, the intermediary module identifies the tasks that are to be performed on the requesting virtual machine to the requesting virtual machine. The virtual machines may perhaps also initiate the performance of such identified tasks. Since the virtual machine itself is initiating contact with the intermediary module, and is not interacting directly with the virtual machine manager, the virtual machine manager need not be in the same sphere of trust as the virtual machine.

First, some introductory discussion regarding computing systems will be described with respect to FIG. 1. Then, embodiments of the environment, structure, and operation of the intermediary virtual machine task management module will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
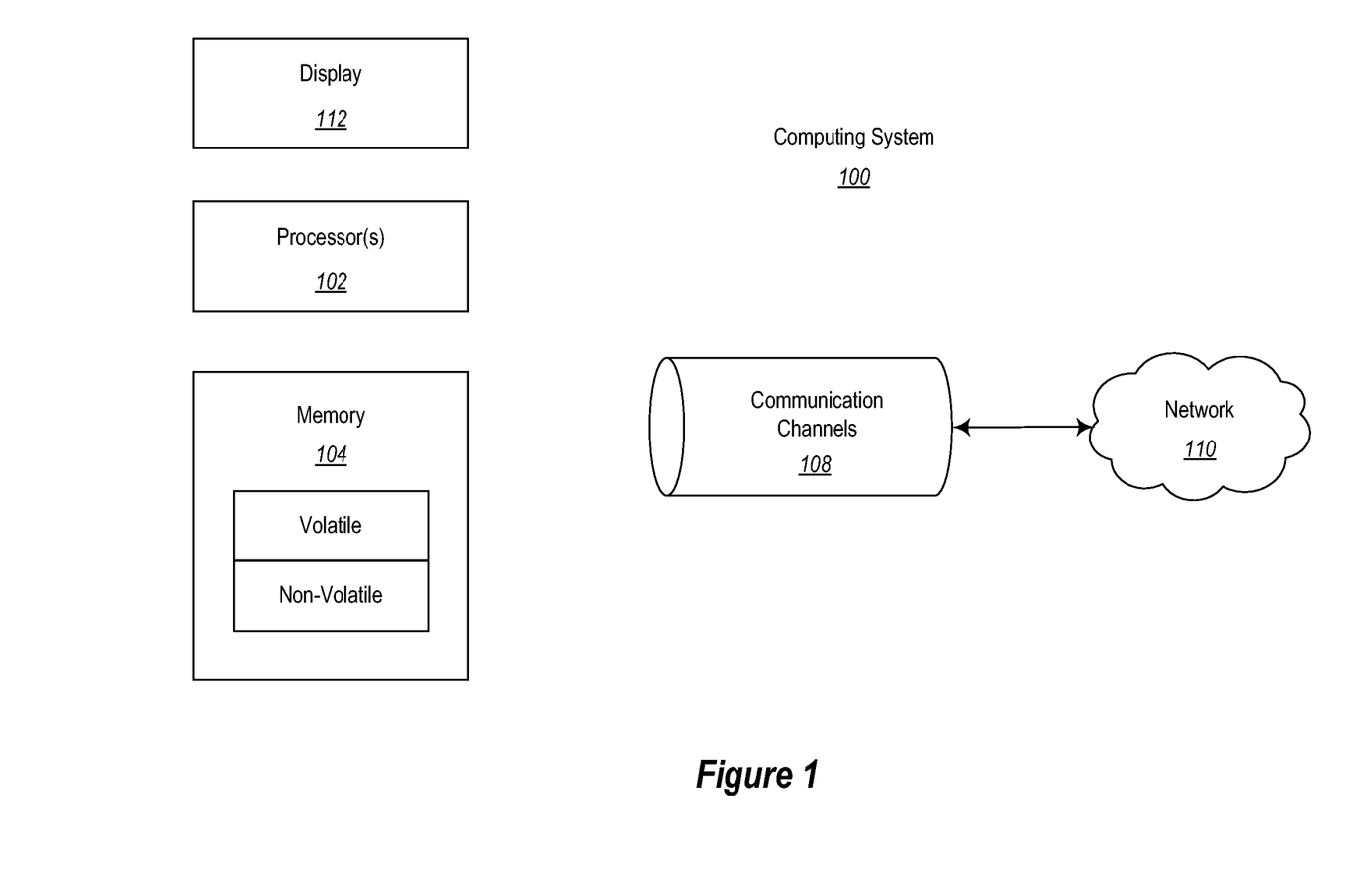
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
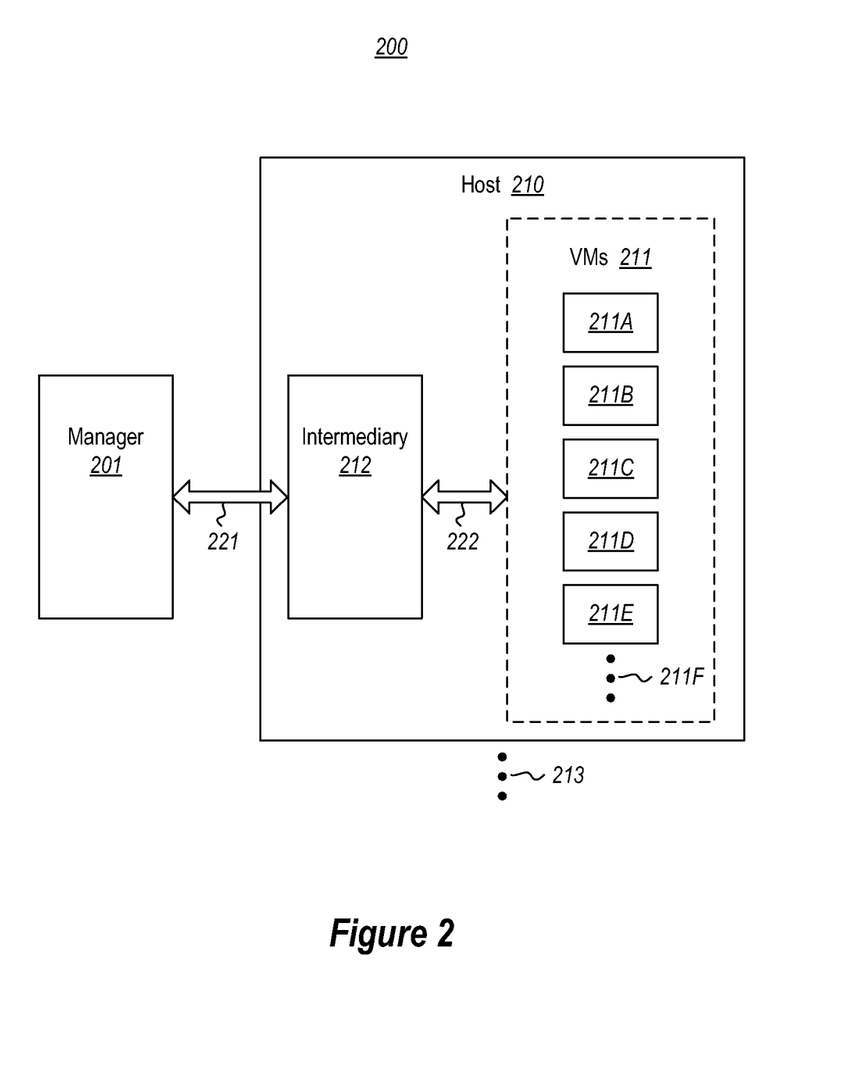
FIG. 2 illustrates an environment in which a virtual machine manager may cause tasks to be performed on virtual machines.

FIG. 2 illustrates an environment 200 in which a virtual machine host may cause tasks to be performed on virtual machines. The environment 200 includes a virtual machine host 210 that operates (or executes) multiple virtual machines 211. The virtual machine host 210 may be structured, for example, as described above for the computing system 100 of FIG. 1. Computing systems that execute multiple virtual machines are often referred to in the technical art of virtualization as "hosts" or "nodes". The principles described herein are not limited to the number of virtual machines executed on the virtual machine host 210 as the number may change quite often as virtual machines are spun up (i.e., begun executing) and retired. Furthermore, while conventional virtual machine hosts are capable of sustaining a certain number of virtual machines, the principles described herein are not limited to a particular number of virtual machines. Nevertheless, for illustrative purposes only, and only as an example, the virtual machines 211 are illustrated as including five virtual machines 211A through 211E, which the ellipses 211F representing wide flexibility in this number.

The virtual machine host 210 also operates an intermediary virtual machine task management module 212 (which will also be referred to herein as more simply the "intermediary module 212"). If implemented in software by the computing system 100 of FIG. 1, the intermediary module 212 may be created by a computing system (such as the computing system 100 of FIG. 1) using one or more processors (such as processor(s) 102 of FIG. 1) to execute computer-executable instructions. Such computer-executable instructions may be embodied on a computer-readable media (such as a computer storage media) that comprise a computer program product. The execution of the instructions may cause the host to instantiate and/or operate the intermediary module 212 as described herein.

The intermediary module 212 intermediates between a virtual machine manager 201 and the virtual machines 211. The virtual machine manager 201 is configured to determine tasks that are to be performed on a particular subset (e.g., one) of the virtual machines 211 executing on the host computing system. As described below, the virtual machine manager 201 does not directly instruct the virtual machines to perform the tasks. Rather, the virtual machine manager 201 provides the tasks to the intermediary 212. The virtual machines then request tasks from the intermediary 212. Thus, the virtual machines 211 need not be in the same sphere of trust as the virtual machine manager 201 in order for the virtual machine manager 201 to provide tasks to be performed by the virtual machines. The manager 201 may not necessarily expressly define individual tasks in the same form that they are identified to the virtual machines. For instance, perhaps the virtual machine manager just sets a goal state for the virtual machine (or some higher level task), and the intermediary module 212 perhaps breaks that task down into smaller components.

In FIG. 2, the ellipses 213 represents that the virtual machine manager 201 may perform the operations described herein for multiple virtual machine hosts by interacting with intermediary modules on each of all or some of those hosts. However, for clarity, the operations of the virtual machine manager 201 will be described with respect to its interactions with a single virtual machine host 210, though the principles described herein may be extended to the signal virtual machine manager 201 performing such operations with respect to multiple virtual machine hosts.

The intermediary module 212 is communicatively coupled to a virtual machine manager 201 as represented by bi-directional arrow 221. The intermediary module 212 is also communicatively coupled to the virtual machines 211 as represented by the bi-directional arrow 222.

Figure 3:
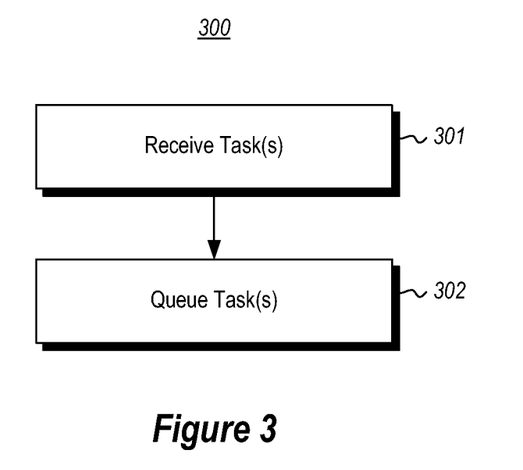
FIG. 3 illustrates a flowchart of a method for communication between the virtual machine manager of FIG. 2 and the intermediary virtual machine task management module of FIG. 2.

FIG. 3 illustrates a flowchart of a method 300 for communication between the virtual machine manager 201 and the intermediary module 212 as represented by the bi-directional arrow 221. The method 300 may be performed upon the intermediary module 212 receiving a task from the virtual machine manager 201 (act 301). The task is to be performed by a subset of the virtual machines 211. For instance, perhaps the task is to be performed by a single one of the virtual machines 211 (e.g., virtual machine 211A). The task may be "received" from the virtual machine manage by receiving information identifying the task, or by receiving information from which it may be inferred that the task is to be performed (such as the identification of a higher level directive or goal state that the performance of the task would further).

The tasks is then queued (act 302). In one embodiment, the received tasks are queued in the same queue (hereinafter referred to as the "single queue" embodiment), regardless of which of the virtual machines 211 the task is to be performed by. In an alternative embodiment (hereinafter referred to as the "multiple queue" embodiment), there is a queue for each virtual machine. In that case, the identity of the target virtual machine is first identified, and then the task is queued (act 302). In the case of the virtual machine manager 201 providing a higher level directive or goal state, the intermediary module 212 may perform some processing in order to identify the task from that directive or goal state.

Figure 4:
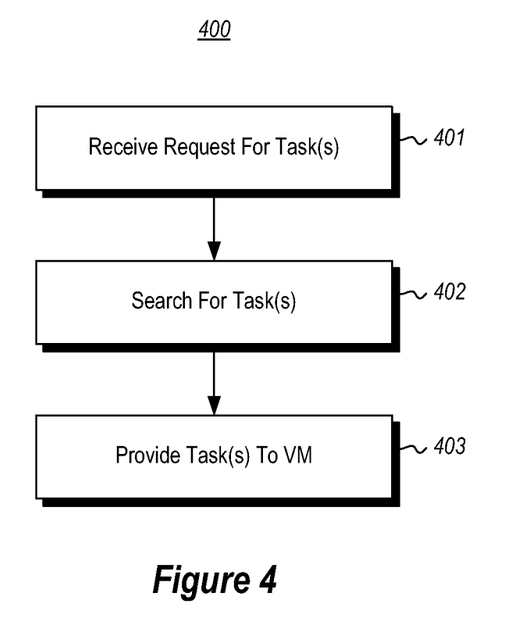
FIG. 4 illustrates a flowchart of a method for communication between the intermediary virtual machine task management module of FIG. 2 and the virtual machines of FIG. 2.

The communications over channel 221 between the virtual machine manager 201 and the intermediary module 212 are not necessarily synchronous with the communications over channel 222 between the intermediary module 212 and the virtual machines 211. Accordingly, FIG. 4 illustrates a flowchart of a separate method 400 for communication between the intermediary module 212 and the virtual machines as represented by the bi-directional arrow 222.

The method 400 is initiated upon receiving a request for one or more tasks from a virtual machine (act 401). The intermediary module 212 then searches the queue for task(s) that are for the requesting virtual machine (act 402). For instance, in the single queue embodiment, the requesting virtual machine is identified, and the queue is traversed to find tasks that are identified as corresponding to the requesting virtual machines. In the multiple queue embodiment, the queue corresponding to the requesting virtual machine is found, and then the tasks inside that queue are inherently for the requesting virtual machine. The intermediary then identifies the tasks to the virtual machine (act 403). The virtual machine may then perhaps perform the task. For instance, in some cases, there may be sufficient trust inherent by the circumstances that the virtual machine may be safe in performing the task.

The communication channel 222 is illustrated as bi-directional as the virtual machines 211 communicate requests to the intermediary module 212, and the intermediary module 212 communicates the tasks to the requesting virtual machine. However, the virtual machines 211 may also communicate other data to the intermediary module 212. For instance, the virtual machine may communicate performance data regarding the virtual machine, telemetry data regarding the virtual machine, the results of performing the tasks, and so forth, to the intermediary module.

As the communication channel 221 between the intermediary module 212 and the virtual machine manager 201 may optionally also be bi-directional, the intermediary module 212 may also report information back to the virtual machine manager 201. For instance, the intermediary module 212 may aggregate data received from the various virtual machines 211, and provide such aggregated data back to the virtual machine manager 201. Alternatively or in addition, the intermediary module 212 may also provide per virtual machine data back to the virtual machine manager 201.

Until this point, the tasks that are to be performed on the virtual machine have been described generally. This is because the broader principles described herein are not limited to the particular type of task to be performed on the virtual machine. However, for clarity, various example tasks will now be described in further detail.

One type of task might be a provisioning task involved with provisioning the virtual machine in a particular beginning goal state ready for operation. When a virtual machine is started up, it is spun up from a particular master image, which dictates the operating system, application set, and configuration information for the virtual machine in its initial state just after being spun up. However, by allowing further provisioning tasks to be performed after the virtual machine is spun up from the master image, further customized provisioning of the virtual machine may be provided. The master images may be structured such that the virtual machine is configured, upon being spun up from that master image, to inquire as to further provisioning tasks. The virtual machine may be further configured to perform the tasks, after perhaps performing some authentication that the task is identified by the virtual machine manager, rather than some other malevolent external component.

Thus, for example, even though there may be a limited number of master images (e.g., perhaps one for each operating system), there may be many other customizations offered to the users of virtual machines. For instance, a user may select not only an operating system, but may pick and choose which applications to have on the virtual machine, which configurations, and what licensing and compliance is to be associated with the virtual machine. Thus, example provisioning tasks might include the installation of a particular application or application set, the installation of a patch or patches on the virtual machine or the performance of some other update on the virtual machine, the enablement or disablement of a feature (such as an operating system feature), a policy alteration or setting task in which certain policies of the virtual machine are adjusted, a compliance check task in which the virtual machine is verified to be in compliance with a set of one or more standards, and/or a licensing operating in which the virtual machine is associated with one or more licenses.

However, tasks are not limited to provisioning tasks, as the methods described herein may also be performed during operation of the virtual machine, after the virtual machine has been provisioned. Accordingly, the following tasks may also occur after provisioning of the virtual machine: the installation of a particular application or application set, the installation of a patch or patches on the virtual machine or the performance of some other update on the virtual machine, the enablement or disablement of a feature, a policy alteration or setting task in which certain policies of the virtual machine are adjusted, a compliance check task in which the virtual machine is verified to be in compliance with a set of one or more standards, and/or a licensing operating in which the virtual machine is associated with one or more licenses.

Figure 5:
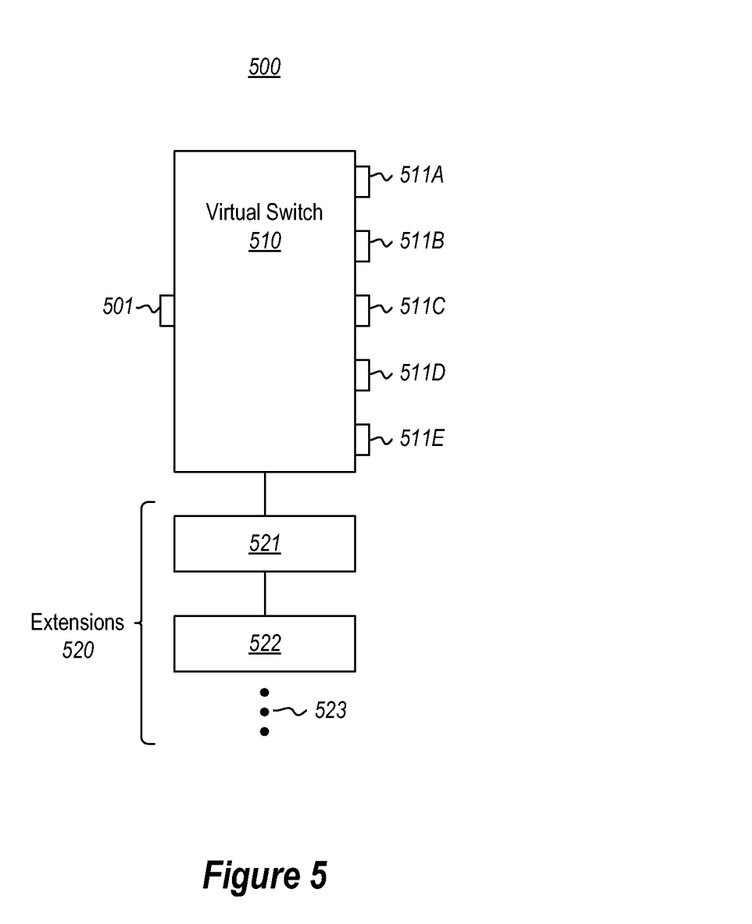
FIG. 5 illustrates an embodiment of the intermediary virtual machine task management module of FIG. 2 in which a virtual switch is used with extension to implement the logic of FIGS. 3 and 4.

FIG. 5 illustrates an embodiment 500 of the intermediary module 212. The intermediary module 500 uses a virtual switch 510. A virtual switch is a component that allows communication between virtual machines, and which may have its functionality enhanced by using switch extensions. Thus, the enhanced virtual switch enables logic to be performed on the communications, rather than just forwarding communications between virtual machines. Here, however, the virtual switch is used to allow for communication between the virtual machine manager 201 and the virtual machines 211.

Virtual switches have associated ports that are used to communicatively couple the virtual switch with external modules. For instance, ports 511A through 511E are used for communication to and from virtual machines 211A through 211E, respectively, and use protocols that the virtual machine uses to communicate. In some cases, the communication protocols for the various virtual machines may differ by virtual machine. Port 501 is used to communication to and from the virtual machine manager 201, and uses the appropriate communication protocols that the virtual machine manager 201 recognizes.

Virtual switches allow for the use of multiple extensions 520 in which logic may be applied to such communications. For instance, the extensions 520 are illustrated as including extension 521 and 522, although the ellipses 523 represent flexibility in the number of such extensions. In one embodiment, the logic of FIGS. 3 and 4 may be embodied using the extensions 520 such that the virtual switch 510 operates with the functionality described herein as performed by the intermediary module 212 of FIG. 2. Similarly, any processing performed by the intermediary module 220 in order to identifying task(s) from higher level directives or goal states may also be set using the extensions 520. Virtual switch extensions allow filtering/capturing/forwarding of network packets. This is leveraged to capture and inject packets to the target virtual machine from the host 210. Switch extension 520 in the virtual switch 510 intercepts the goal state request from the target virtual machine 211, and replies to that request from the corresponding task queue.

Referring again to FIG. 2, the channel 221 between the host 210 and the virtual machine manager 201 could also use a different or separate management Network Interface Card (NIC) channel that is different than the virtual switch 510 to which the virtual machine 211 is connected to. In this embodiment, the extensions 520 inside the virtual switch 510 is leveraged from the host-virtual machine communication channel 222. When the extension 520 in the virtual switch 510 intercepts the request from the virtual machine, the virtual machine looks up the intermediary virtual machine task management mode and injects the response back to the virtual machine with the corresponding task.

The environment 200 of FIG. 2 allows the virtual machine manager 201 to ask that tasks be performed by the virtual machines by submitting such tasks to the intermediary module 212. The virtual machines 211 are in a common sphere of trust with the intermediary module, and thus trust the intermediary module sufficiently to inquire as to the tasks to be performed. Accordingly, even through the virtual machines may not be in the same sphere of trust as the virtual machine manager 201, the virtual machine manager 201 may still request that tasks be performed, and if there is sufficient trust in the process, the virtual machines 211 may have those tasks performed on themselves. Thus, the virtual machines 211 may maintain their security, while still having helpful tasks performed on them.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more memories storing computer-executable instructions that are structured such that, when executed by one or more processors of a virtual machine host computing system, the virtual machine host computing system is configured to perform at least the following:
    establish, by an intermediary virtual machine task management module that is executing at the virtual machine host computing system, (i) a first network communications channel with a virtual machine manager that executes on a separate computer system, and (ii) one or more second communication channels with a plurality of virtual machines that also execute at the virtual machine host computing system, the plurality of virtual machines being in a common trust sphere with the intermediary virtual machine task management module and being in a different trust sphere than the virtual machine manager;
    receive, by the intermediary virtual machine task management module from the virtual machine manager over the first network communications channel, a task directive specifying a processing goal to be performed by the plurality of virtual machines that are executing at the virtual machine host computing system;
    identify, by the intermediary virtual machine task management module, a plurality of intermediary tasks for accomplishing the requested processing goal, and place the identified plurality of intermediary tasks in a queue; and
    based at least on receiving a task request from a requesting virtual machine of the plurality of virtual machines, perform at least the following:

search, by the intermediary virtual machine task management module, the queue for one or more intermediary tasks of the plurality of intermediary tasks that are for the requesting virtual machine, including traversing the queue to find any intermediary tasks that are identified as corresponding to the requesting virtual machine; and send the one or more intermediary tasks to the requesting virtual machine over the one or more second communications channels for execution by the requesting virtual machine as part of accomplishing the processing goal.

2. The computer program product in accordance with claim 1, wherein the one or more intermediary tasks are to install an application at the requesting virtual machine.

3. The computer program product in accordance with claim 1, wherein the one or more intermediary tasks are to install a patch on the requesting virtual machine.

4. The computer program product in accordance with claim 1, wherein the one or more intermediary tasks are to perform an update on the requesting virtual machine.

5. The computer program product in accordance with claim 1, wherein the one or more intermediary tasks are to enable or disable a feature on the requesting virtual machine.

6. The computer program product in accordance with claim 1, wherein the one or more intermediary tasks are to affect a policy of the requesting virtual machine.

7. The computer program product in accordance with claim 1, wherein the one or more intermediary tasks are to perform a compliance check of the requesting virtual machine.

8. The computer program product in accordance with claim 1, wherein the one or more intermediary tasks are to perform a licensing operation on the requesting virtual machine.

9. The computer program product in accordance with claim 1, wherein the virtual machine host computing system creates the intermediary virtual machine task management module by instantiating the intermediary virtual machine task management module in memory at the virtual machine host computing system.

10. A computing system, comprising:
one or more hardware processors; and
one or more computer storage media comprising a hardware device having stored thereon computer-executable instructions that are structured such that, when executed by the one or more hardware processors, the computing system is configured to perform at least the following:
establish, by an intermediary virtual machine task management module that is executing at the computing system, (i) a first network communications channel with a virtual machine manager that executes on a separate computer system, and (ii) one or more second communication channels with a plurality of virtual machines that also execute at the computing system, the plurality of virtual machines being in a common trust sphere with the intermediary virtual machine task management module and being in a different trust sphere than the virtual machine manager;
receive, by the intermediary virtual machine task management module from the virtual machine manager over the first network communications channel, a task directive specifying a processing goal to be performed by the plurality of virtual machines that are executing at the virtual machine host computing system;
identify, by the intermediary virtual machine task management module, a plurality of intermediary tasks for accomplishing the requested processing goal, and place the identified plurality of intermediary tasks in a queue; and
based at least on receiving a task request from a requesting virtual machine of the plurality of virtual machines, perform at least the following:
search, by the intermediary virtual machine task management module, the queue for one or more intermediary tasks of the plurality of intermediary tasks that are for the requesting virtual machine, including traversing the queue to find any intermediary tasks that are identified as corresponding to the requesting virtual machine; and
send the one or more intermediary tasks to the requesting virtual machine over the one or more second communications channels for execution by the requesting virtual machine as part of accomplishing the processing goal.

11. The computing system in accordance with claim 10, wherein the intermediary virtual machine task management module comprises a virtual switch, and wherein the intermediary virtual machine task management module is communicatively coupled to one or more of the plurality of virtual machines via one or more ports of the virtual switch.

12. The computing system in accordance with claim 11, wherein logic of the intermediary virtual machine task management module is at least partially executed by an extension of the virtual switch.

13. The computing system in accordance with claim 10, wherein the intermediary virtual machine task management module is further configured to communicate data from the plurality of virtual machines to the virtual machine manager.

14. The computing system in accordance with claim 13, wherein the communicated data is performance data regarding the requesting virtual machine.

15. The computing system in accordance with claim 13, wherein the communicated data is telemetry data regarding the requesting virtual machine.

16. The computing system in accordance with claim 13, wherein the communicated data is a result of performance of at least one intermediary task by the virtual machine.

17. The computing system in accordance with claim 10, wherein the one or more intermediary tasks are one or more of installing an application at the requesting virtual machine, installing a patch on the requesting virtual machine, performing an update on the requesting virtual machine, enabling a feature on the requesting virtual machine, disabling a feature on the requesting virtual machine, affecting a policy of the requesting virtual machine, performing a compliance check of the requesting virtual machine, or performing a licensing operation on the requesting virtual machine.

18. The computing system in accordance with claim 10, wherein the requesting virtual machine authenticates the one or more intermediary tasks prior to performing the one or more intermediary tasks.

19. The computing system in accordance with claim 10, wherein the first network communications channel is a bi-directional network communications channel.

20. A method, implemented by one or more processors of a virtual machine host computing system, the method comprising:
establishing, by an intermediary virtual machine task management module executing at the virtual machine host computing system, (i) a first network communications channel with a virtual machine manager that executes on a separate computer system, and (ii) one or more second communications channels with a plurality of virtual machines that are also executing at the virtual machine host computing system, the plurality of virtual machines being in a common trust sphere with the intermediary virtual machine task management module and being in a different trust sphere than the virtual machine manager;

receiving, by the intermediary virtual machine task management module from the virtual machine manager over the first network communications channel, a task directive specifying processing goal to be performed by the plurality of virtual machines that are executing at the virtual machine host computing system;

identifying, by the intermediary virtual machine task management module, a plurality of intermediary tasks for accomplishing the requested processing goal, and place the identified plurality of intermediary tasks in a queue; and based at least on receiving a task request from a requesting virtual machine of the plurality of virtual machines over the one or more second communications channels, perform at least the following:

searching, by the intermediary virtual machine task management module, the queue for one or more intermediary tasks of the plurality of intermediary tasks that are for the requesting virtual machine, including traversing the queue to find any intermediary tasks that are identified as corresponding to the requesting virtual machine; and sending the one or more intermediary tasks to the requesting virtual machine over the one or more second communications channels for execution by the requesting virtual machine as part of accomplishing the processing goal.

21. The method in accordance with claim 20, wherein the requesting virtual machine authenticates the intermediary task prior to performing the intermediary task.

22. The method in accordance with claim 20, wherein the first network communications channel is a bi-directional network communications channel.

\* \* \* \* \*